No. 738,614. Patented September 8, 1903.

UNITED STATES PATENT OFFICE.

MAX H. ISLER, OF MANNHEIM, GERMANY, ASSIGNOR TO THE BADISCHE ANILIN & SODA FABRIK, OF LUDWIGSHAFEN-ON-THE-RHINE, BAVARIA, GERMANY, A CORPORATION OF BADEN.

ANTHRACENE DYE AND PROCESS OF MAKING SAME.

SPECIFICATION forming part of Letters Patent No. 738,614, dated September 8, 1903.

Application filed October 16, 1900. Serial No. 33,268. (Specimens.)

*To all whom it may concern:*

Be it known that I, MAX H. ISLER, a citizen of the Swiss Republic, residing at Mannheim, in the Grand Duchy, of Baden, Germany, have invented new and useful Improvements in Anthracene Coloring-Matters, of which the following is a specification.

This invention relates to the production of blue to blue-green coloring-matters of the anthracene series.

The initial material can be prepared from a diamido-anthraquinone by suitable treatment with formic aldehyde and sulfurous acid according to the process of German Patent No. 112,115 and which is hereinafter termed the "sulfo-methylene derivative of diamido-anthraquinone." Now I have discovered that when the so-resulting product is treated with a halogenizing agent a corresponding halogen derivative of the said sulfomethylene derivative results, which halogen derivative on suitable treatment with an aromatic amin—such as anilin, paratoluidin, &c.—and subsequent sulfonation yields my new coloring-matter, which dyes wool in shades within the range of from blue to blue-green.

The sulfo-methylene derivative of diamido-anthraquinone may be prepared as follows:

*Example 1.*—Heat a mixture of one hundred (100) kilograms of a ten (10) per cent. paste of 1.5-diamido-anthraquinone, three hundred (300) liters of water, ten (10) kilograms of a forty (40) per cent. solution of formic aldehyde, twenty (20) liters of forty (40) per cent. sodium-bisulfite solution, and forty (40) liters of fuming hydrochloric acid of thirty-three (33) per cent. HCl to sixty (60) degrees centigrade, while stirring until all or almost all of the diamido-anthraquinone has gone into solution, giving a red color. This is effected in a comparatively short time. Filter, precipitate the filtrate by means of common salt, press, and dry. My initial material may also be prepared by substituting for the 1.5-diamido-anthraquinone of the preceding example another diamido-anthraquinone, such as 1.8 or 1.3 diamido-anthraquinone.

In the following examples I further illustrate the nature of my invention and the manner in which it may be carried into effect, but do not wish to be understood as considering it limited to these. The parts are by weight.

*Example 2—Production of a bromin derivative of the product of Example 1 in aqueous mixture.*—The product resulting from Example 1 when employing one hundred (100) kilograms of a ten (10) per cent. paste of 1.5-diamido-anthraquinone is made into a paste with fifteen hundred (1500) liters of water, and forty-five (45) kilograms of bromin are added and the whole allowed to stand at ordinary temperature until the presence of the initial material can no longer be shown. Filter, precipitate with common salt, press, and dry.

*Example 3—Production of a bromin derivative of the product of Example 1 in glacial-acetic-acid mixture.*—Mix ten (10) kilograms of the dry product of Example 1 with one hundred (100) kilograms of glacial acetic acid and thirty (30) kilograms of bromin. Boil this mixture for about one-half ($\frac{1}{2}$) hour. Filter, wash the solid product with glacial acetic acid, and dry.

*Example 4—Production of a chlorin derivative of the product of Example 1.*—Gradually mix ten (10) kilograms of the dry product of Example 1 with one hundred and fifty (150) kilograms of concentrated hydrochloric acid (containing thirty-three (33) per cent. HCl) and six (6) kilograms of potassium chlorate. Care should be taken that the temperature does not rise above thirty (30) or forty (40) degrees centigrade. After the lapse of from one (1) to two (2) hours dilute this result with five (5) volumes of water and filter. The solid is the chlorin derivative. In place of the product made from 1.5-diamido-anthraquinone I can only employ the product made from other diamido-anthraquinones, such as specified, and submit them to the action of a halogenizing agent, as illustrated in Examples 2, 3, and 4, when a halogen product will be obtained which possesses analogous properties.

In the following table I summarize some of the properties of some of my new compounds containing halogen:

| Properties. | Product of Example 1 from 1.5-diamido-anthraquinone halogenized according to— | | | Product of Example 1 from 1.3-diamido-anthraquinone halogenized according to— | | Product of Example 1 from 1.8-diamido-anthraquinone halogenized according to— | |
|---|---|---|---|---|---|---|---|
| | Example 2. | Example 3. | Example 4. | Example 2. | Example 3. | Example 2. | Example 3. |
| Solubility in water | Reddish-yellow solution, giving a red precipitate with caustic soda. | Insoluble. | Insoluble. | Partially soluble; contains some insoluble material. | Insoluble. | Partially soluble; contains insoluble material. | Insoluble. |
| Behavior toward cold dilute caustic-soda solution. | See above. | Insoluble. | Insoluble. | Insoluble. | Insoluble. | Insoluble. | Insoluble. |
| Behavior toward cold concentrated sulfuric acid of 66° Baumé | Green color. | Brown color. | Yellow-brown color. | Green color. | Reddish-brown color. | Reddish-brown color. | Yellowish-brown color. |
| Behavior toward ethyl alcohol. | Reddish-yellow solution. | On boiling, red solution. | Reddish-yellow solution. | Reddish-yellow solution. | Reddish-yellow solution. | Yellowish-red solution. | Yellowish-red solution. |
| Behavior toward boiling paratoluidin. | At once, a yellow-red color; in the course of one hour, blue; beyond that, green. | At once, a red; in the course of two hours, blue. | At once, a brown red; after a long boiling, an olive green. | After two hours, blue. | After two hours, blue. | After two hours, blue. | After two hours, blue. |

By treatment of an aforesaid halogen compound with an aromatic amin and sulfonating this product I arrive at the new coloring-matter, which I particularly desire to protect by the application for Letters Patent.

*Example 5—Production of new coloring-matter from the product of Example 2.*—Boil a mixture of ten (10) parts of the dried product of Example 2 with one hundred (100) parts of paratoluidin until the melt assumes a blue-green color. This usually takes place in the course of from four (4) to five (5) hours. Cool, add three hundred (300) parts of ethyl alcohol, warm gently until the excess of paratoluidin is dissolved, and filter off from the new solid product. The alcoholic filtrate contains some of my new solid product and may be recovered from it by distilling off the alcohol and removing the paratoluidin by means of dilute hydrochloric acid.

To convert my new product into the sulfonation product, one (1) part of the well-dried material and from ten (10) to twenty (20) parts of concentrated sulfuric acid of ninety-six (96) per cent $H_2SO_4$ are mixed together and stirred for about twelve (12) hours at a temperature of from forty (40) to fifty (50) degrees centigrade; cool, and pour the melt into water, filter, and wash with salt brine until neutral. The coloring-matter so obtained dyes unmordanted or chrome-mordanted wool a blue-green shade. In place of paratoluidin in this example I may employ another aromatic amin, such as analin, when an analogous coloring-matter results.

*Example 6—Production of a new coloring-matter from the product of Example 4.*—Mix ten (10) parts of the product of Example 4 with one hundred (100) parts of paratoluidin and boil for from two (2) to three (3) hours. Work up the so-obtained melt in the same manner as in Example 5 and sulfonate in the same manner, when my new coloring-matter likewise results. In place of paratoluidin in this example I may employ another aromatic amin, such as anilin, when an analogous coloring-matter results. In place of the halogen products which can be derived from the products resulting from 1.5-diamido-anthraquinone I can also employ such halogen compounds as may be obtained from the products resulting from another diamido-anthraquinone, such as 1.8 or 1.3 diamido-anthraquinone.

In the following table I summarize some of the properties of the sulfonation product of some of my new coloring-matters.

|  | Sulfo-acid obtained from product of Example 1 from 1.5 diamido-anthraquinone and halogenized according to Example 2 and this product treated with— | | Sulfo-acid obtained from product of Example 1 from 1.5 diamido-anthraquinone and halogenized according to Example 4 and this product treated with— | | Sulfo-acid obtained from product of Example 1 from 1.3 diamido-anthraquinone and halogenized according to Example 2 and this product treated with— | Sulfo-acid obtained from product of Example 1 from 1.8-diamido-anthraquinone and halogenized according to Example 3 and this product treated with— |
|---|---|---|---|---|---|---|
|  | Paratoluidin. | Anilin. | Paratoluidin. | Anilin. | Paratoluidin. | Paratoluidin. |
| Appearance of the dry powder. | Indigo-like blue. | Blue black. | Blue black. | Blue black. | Grayish blue. | Blue. |
| Appearance of the solution in water. | Blue green. | Pure blue. | Blue. | Blue. | Pure blue. | Pure blue. |
| Behavior toward anilin | Blue-green solution. | Insoluble. | Blue-green solution when boiled. | Insoluble. | Green-blue solution. | Bluish-green solution. |
| Behavior toward ninety-five-per-cent. ethyl alcohol. | Blue-green solution. | Blue solution when boiled. | Blue solution in the cold. | Blue solution when boiled. | Blue solution. | Blue solution. |
| Behavior toward sulfuric acid of 66° Baumé. | Violet-red color. | Cherry-red color. | Violet color. | Red color. | Bluish-red color. | Bluish-red color. |
| Behavior toward sulfuric acid and boric acid. | Green color on heating. | Blue-green color on heating. | Blue-green color on heating. | Blue green. | Green color. | Green color. |
| Dyes wool | Unmordanted or chrome-mordanted blue-green shade. |  |  |  | Blue green. | Blue green. |

My new coloring-matters possess the following generic properties: They are acid dyes soluble in water, yielding blue to blue-green solutions and which dye wool from the acid-bath, giving blue-green to blue shades both when the wool is unmordanted or when it is mordanted with a chrome-mordant. Upon chemical analysis my new coloring-matter will be seen to contain chlorin or bromin.

Now what I claim is—

1. The process for the production of blue to blue-green coloring-matters of the anthracene series which consists in treating the sulfo-methylene derivative of diamido-anthraquinone with a halogenizing agent then melting the resulting halogen derivative with an aromatic amin and subsequently sulfonating the product so obtained.

2. The process for the production of coloring-matters of the anthracene series which consists in treating the sulfo-methylene derivative of diamido-anthraquinone with a halogenizing agent then melting the resulting halogen derivative with an aromatic amin.

3. The process for the production of coloring-matters of the anthracene series which consists in treating the sulfo-methylene derivative of diamido-anthraquinone with a halogenizing agent.

4. The new coloring-matters of the anthracene series such as can be obtained by treating the sulfo-methylene derivative of diamido-anthraquinone with a halogenizing agent and melting the resulting halogen derivative with an aromatic amin, and which when sulfonated dissolve in water or ethyl alcohol giving a blue to blue-green solution, the aqueous solution dyeing wool whether unmordanted or mordanted with chrome giving blue to blue-green shades, and which contain halogen.

5. The coloring-matter which can be obtained by treating the sulfo-methylene derivative of diamido-anthraquinone with a halogenizing agent and melting the resulting halogen derivative with paratoluidin which in the sulfonated form yields a blue-green to blue solution in water, dyeing unmordanted or chrome-mordanted wool blue-green shades, which dissolves in anilin and alcohol yielding a blue-green to blue solution and in concentrated sulfuric acid yielding a violet-red to bluish-red solution, whose solution in concentrated sulfuric acid to which boric acid has been added is green to blue-green.

In testimony whereof I have hereunto set my hand in the presence of two subscribing witnesses.

MAX H. ISLER.

Witnesses:
ERNEST F. EHRHARDT,
PERCY J. JONES.